United States Patent [19]

Hatase et al.

[11] Patent Number: 4,733,264

[45] Date of Patent: Mar. 22, 1988

[54] CHARGE-COUPLED DEVICE FOR AUTOMATIC FOCUSING AND CAMERA SHAKE DETECTOR USING SUCH CHARGE-COUPLED DEVICE

[75] Inventors: Takayuki Hatase, Yokohama; Yoshimi Ohno, Kawasaki; Susumu Iguchi, Yokohama; Daisuke Hata, Funabashi; Kazumasa Aoki, Tokyo, all of Japan

[73] Assignee: Ricoh Company, Ltd., Tokyo, Japan

[21] Appl. No.: 11,242

[22] Filed: Feb. 5, 1987

[30] Foreign Application Priority Data

Feb. 5, 1986 [JP] Japan .............................. 61-023609
Feb. 20, 1986 [JP] Japan .............................. 61-035546
Feb. 27, 1986 [JP] Japan .............................. 61-042353

[51] Int. Cl.$^4$ ........................... G03B 7/08; G03B 3/00
[52] U.S. Cl. ..................................... 354/430; 354/408
[58] Field of Search .............. 354/402, 406, 407, 408, 354/430; 250/201 R, 201 PF, 204, 221, 578; 358/105; 356/28

[56] References Cited

U.S. PATENT DOCUMENTS

| | | | |
|---|---|---|---|
| 4,503,325 | 3/1985 | Araki | 354/402 X |
| 4,523,101 | 6/1985 | Tsunekawa | 250/578 |
| 4,527,053 | 7/1985 | Kinoshita et al. | 354/406 X |
| 4,587,415 | 5/1986 | Tsunekawa et al. | 250/204 |
| 4,618,235 | 10/1986 | Ishida et al. | 354/406 X |
| 4,647,979 | 3/1987 | Urata | 354/430 X |
| 4,673,276 | 6/1987 | Yoshida | 354/430 |

Primary Examiner—W. B. Perkey
Attorney, Agent, or Firm—Oblon, Fisher, Spivak, McClelland & Maier

[57] ABSTRACT

A charge-coupled device has a plurality of photodiode arrays, a plurality of storage electrodes, a plurality of shift gates, a plurality of reset terminals, and a plurality of shift terminals, which can be operated at different timings. Object images detected by the charge-coupled device at a certain time interval are compared for camera shake detection.

2 Claims, 14 Drawing Figures

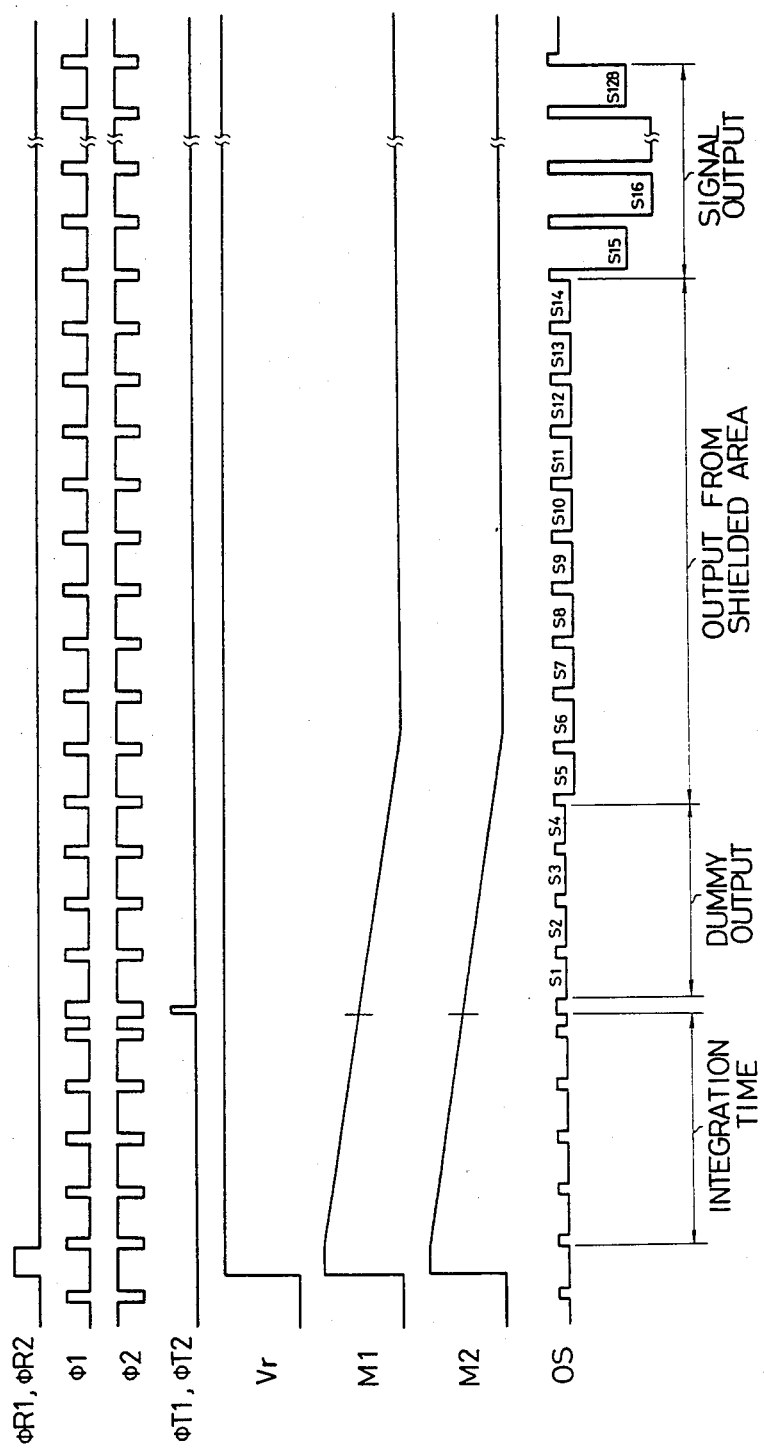
F I G. 2

CHARGE-COUPLED DEVICE FOR AUTOMATIC FOCUSING AND CAMERA SHAKE DETECTOR USING SUCH CHARGE-COUPLED DEVICE

BACKGROUND OF THE INVENTION

1. Field of the Invention

The present invention relates to a charge-coupled device for automatically focusing a camera and a camera shake detector using this charge-coupled device.

2. Description of the Prior Art

When an object of low brightness is photographed by a camera, the shutter speed of the camera is low, and any tendency of the camera to shake would result in a blurred or double image. Therefore, it has been customary to detect those shutter speeds lower than a certain shutter speed, which would cause a problem with respect to camera shake, and to give an indication to the user of a possible problem of camera shake.

One conventional camera shake detector utilizes an automatic exposure control device for detecting a possible camera shake based on information about the brightness of an object to be photographed. However, it is known that whether a camera will shake or not is related to not only the object brightness but also how fast the object is moving. More specifically, an orginary object which is still or moving slowly may not cause any camera shake at a certain shutter speed, but a fast moving object may produce a blurred image on the film at the same shutter speed. The prior camera shake detector fails to detect such a camera shake when photographing the fast moving object. The critical shutter speed below which camera shaking will take place also differs from user to user dependent on the skill of the user. No conventional camera shake detector has been designed to effect camera shake detection dependent on how skillful the user may be.

SUMMARY OF THE INVENTION

In view of the aforesaid problems of the conventional camera shake detector, it is an object of the present invention to provide a charge-coupled device for automatically focusing a camera and a camera shake detector utilizing such a charge-coupled device or an automatic focusing device, for enabling camera shake detection to be effected dependent on the speed of movement of an object and also for allowing camera shake detection, if necessary, according to the skill of the camera user.

According to the present invention, there is provided a charge-coupled device for use in automatic focusing in a camera, comprising a plurality of photodiode arrays, a plurality of storage electrodes associated respectively with the photodiode arrays, a plurality of shift gates associated respectively with the storage electrodes, a single analog shift register associated with all photodiodes of the photodiode arrays, a plurality of reset terminals for applying reset pulses to the storage electrodes, respectively, and a plurality of shift terminals for applying shift pulses to the shift gates, respectively.

According to the present invention, there is also provided a camera shake detector comprising a light detector group for photoelectrically converting an object image formed by an optical system, a monitoring light detector disposed in the vicinity of the light detector group for photoelectrically converting the average brightness of the object image, clear pulse generator means for generating a clear pulse to clear the monitoring light detector and the light detector group to a certain level, decision means for ascertaining whether an output from the monitoring light detector drops below a reference voltage, shift pulse generator means for issuing a shift pulse to shift stored charges from the light detector group to a transfer unit when the output from the monitoring light detector is found to be lower than the reference voltage by the decision means, and for issuing a second shift pulse to shift stored charges from the light detector group to the transfer unit again after the first-mentioned stored charges have been transferred from the light detector group, transfer pulse generator means for generating a transfer pulse to transfer the stored charges from the light detector group, time equalizer means for equalizing a time period between a first clear pulse and a first shift pulse to a time period between a second clear pulse and a second shift pulse, and a comparator/processor for comparing first and second image output signals from the light detector group to ascertain whether there is a camera shake.

According to the present invention, there is also provided a camera shake detector comprising a first light detector group for photoelectrically converting an object image formed by an optical system, a second light detector group for photoelectrically converting an object image formed by another optical system, a monitoring light detector disposed in the vicinity of the first and second light detector groups for photoelectrically converting the average brightness of the object image, first clear pulse generator means for generating a first clear pulse to clear the monitoring light detector and the first light detector group to a certain level, second clear pulse generator means for generating a second clear pulse to clear the second light detector group to a ceratin level upon elapse of a time period after the first clear pulse has been generated by the first clear pulse generator means, decision means for ascertaining whether an output from the monitoring light detector drops below a reference voltage, first shift pulse generator means for issuing a first shift pulse to shift stored charges from the first light detector group to a transfer unit when the output from the monitoring light detector is found to be lower than the reference voltage by the decision means, second shift pulse generator means for generating a second shift pulse to transfer stored charges from the second light detector group to the transfer unit, with a time delay between the first and second shift pulses being equalized to a time delay between the first and second clear pulses, and a comparator/processor for comparing image output signals from the first and second light detector groups to ascertain whether there is a camera shake.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2 is a timing chart of operation in a single mode of the charge-coupled device shown in FIG. 1;

DETAILED DESCRIPTION

Figure 1:
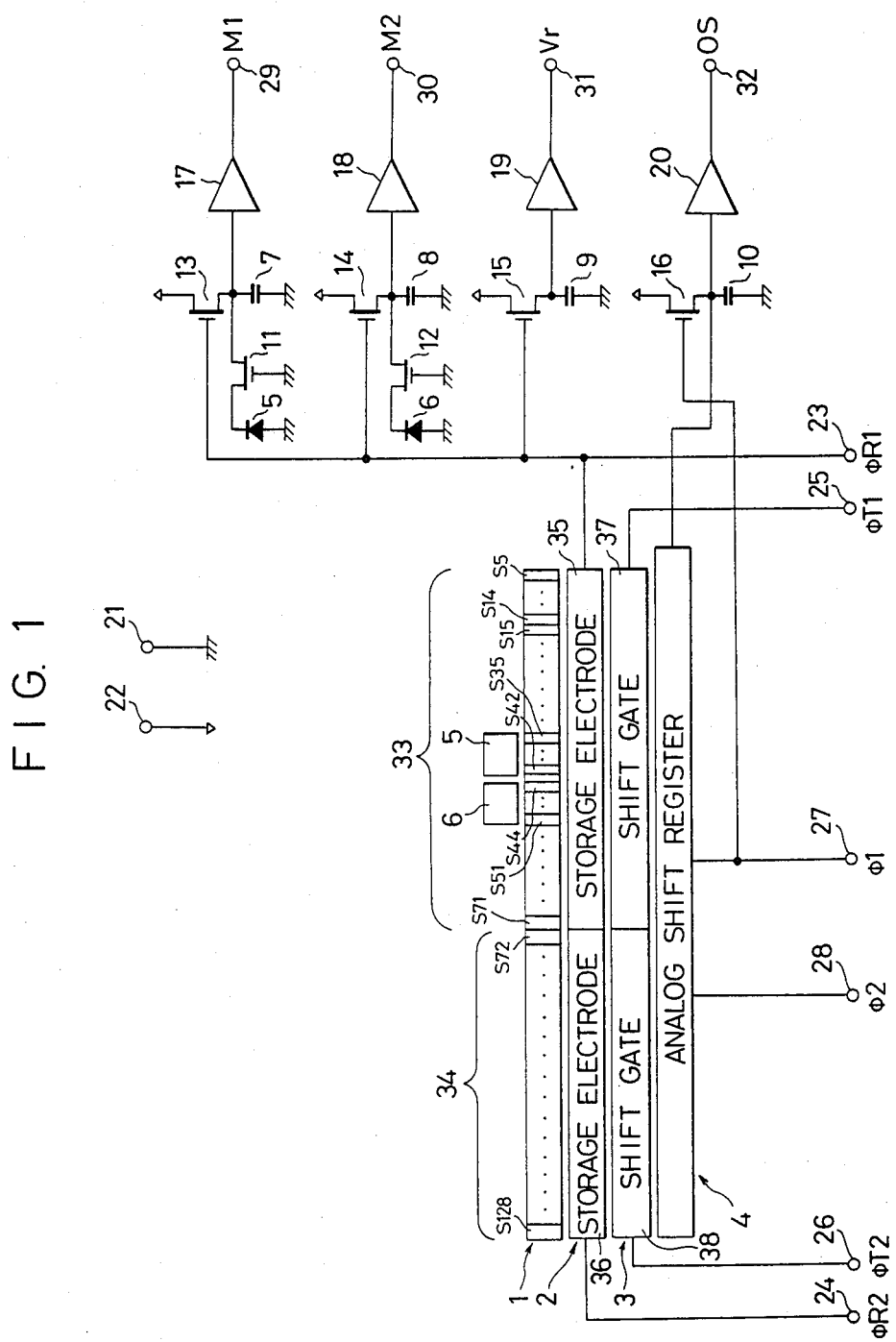
FIG. 1 is a circuit diagram, partly in block form, of a charge-coupled device for automatic focusing according to the present invention.

FIG. 1 shows a charge-coupled device (hereinafter referred to as a "CCD") for automatically focusing a camera having a photodiode array 1, a storage electrode 2, a shift gate 3, an analog shift register 4, monitoring photodiodes 5, 6, capacitors 7 through 10, field-effect transistors 11 through 16, buffer amplifiers 17 through 20, power supply terminals 21, 22, reset terminals 23, 24, shift terminals 25, 26, transfer terminals 27, 28, and output terminals 29 through 32. The analog shift register 4 is a single analog shift register having 128 bits corresponding to all photodiodes of the photodiode array 1. The photodiode array 1 includes 128 photodiodes S1 through S128 arranged as a straight array. The 4-bit photodiodes S1 through S4 are dummy photodiodes, and the 10-bit photodiodes S5 through S14 are shielded from light by an aluminum electrode. The photodiode array 1 is divided into a photodiode array 33 comprising 5th-bit through 71st-bit photodiodes S5–S71, and a photodiode array 34 comprising 72nd-bit through 128th-bit photodiodes S72–S128. Similarly, the storage electrode 2 is divided into two storage electrodes 35, 36 corresponding to the photodiode arrays 33, 34, respectively, and the shift gate 3 is divided into two shift gates 37, 38 corresponding to the photodiode arrays 33, 34, respectively. The photodiode arrays 33, 34 detect light from an object through automatic focusing optical systems and generate photoelectric currents. The storage electrodes 35, 36 are reset by reset pulses $\phi R1$, $\phi R2$ supplied respectively from the reset terminals 23, 24 prior to integration of the photoelectric currents (charge storage). The storage electrode 35 integrates the photoelectric currents from the photodiodes of the photodiode array 33, whereas the storage electrode 36 integrates the photoelectric currents from the photodiodes of the photodiode array 34. Upon completion of integration of the photoelectric currents in the storage electrode 35, the shift gate 37 is opened by a shift pulse $\phi T1$ from the shift terminal 25 to transfer the charges stored in the storage electrode 35, in parallel, to the analog shift register 4. Likewise, when integration of the photoelectric currents in the storage electrode 36 is completed, the shift gate 38 is opened by a shift pulse $\phi T2$ from the shift terminal 26 to transfer the charges stored in the storage electrode 36, in parallel, to the analog shift register 4. The analog shift register 4 responds to freely running two-phase transfer pulses $\phi 1$, $\phi 2$ from the transfer terminals 27, 28 to successively transfer the charges from the storage electrodes 35, 36, thus charging the capacitor 10. The voltage across the capacitor 10 is amplified by the buffer amplifier 20 and issued as an image signal OS from the output terminal 32. The field-effect transistor 16 is turned on by the transfer pulse $\phi 1$ from the transfer terminal 27 to charge the capacitor 10 up to the power supply voltage, whereupon the capacitor 10 is reset.

The monitoring photodiodes 5, 6 are positioned near a substantially central area of the photodiode array 33, and are aligned with the 35th- through 42th-bit photodiodes S35–S42 and the 44th- through 51-bit photodiodes S44–S51, respectively, in the photodiode array 33. The monitoring photodiodes 5, 6 are biased to substantially 0 by the field-effect transistors 11, 12, respectively, and generate photoelectric currents in response to light from the object for thereby charging the capacitors 7, 8, respectively. The voltages across the capacitors 7, 8 are applied via the buffer amplifiers 17, 18 and issued as monitor signals M1, M2, respectively, through the output terminals 29, 30. The field-effect transistors 13, 14 are turned on by the reset pulse $\phi R1$ from the reset terminal 23 to charge the capacitors 7, 8 up to the power supply voltage, whereupon the capacitors 7, 8 are reset. The field-effect transistor 15 is turned on by the reset pulse $\phi R1$ to charge the capacitor 9 up to the power supply voltage. The voltage across the capacitor 9 is applied via the buffer amplifier 19 and issued from the output terminal 31 as a reference voltage Vr for comparing the levels of the monitor signals M1, M2.

The operation of the CCD, thus constructed will hereinafter be described with reference to FIGS. 2 and 3.

FIG. 2 shows a timing chart of a single mode of operation of the CCD. The reset terminals 23, 24 are supplied with reset pulses $\phi R1$, $\phi R2$, respectively, at the same timing to reset the storage electrodes 35, 36 and the capacitors 7 through 9. At the same time that the photoelectric currents from the photodiode arrays 33, 34 start being integrated by the storage electrodes 35, 36, the voltages across the capacitors 7, 8 begin to drop due to the photoelectric currents from the monitoring photodiodes 5, 6. A shift pulse generator (not shown) compares a voltage A indicative of the average value of the monitor signals M1, M2 or one of the monitor signals M1, M2 with a trip voltage B derived from the reference voltage Vr from the output terminal 31. When the voltage A is lower than the trip voltage B, the shift pulse generator applies shift pulses to the shift terminals 25, 26 thereby opening the shift gates 37, 38, which then allows the charges from the storage electrodes 35, 36 to be transferred to the analog shift register 4. The analog shift register 4 successively transfers the charges, via the buffer amplifier 20, to the output terminal 32, from which they are issued as an image signal OS.

Figure 3:
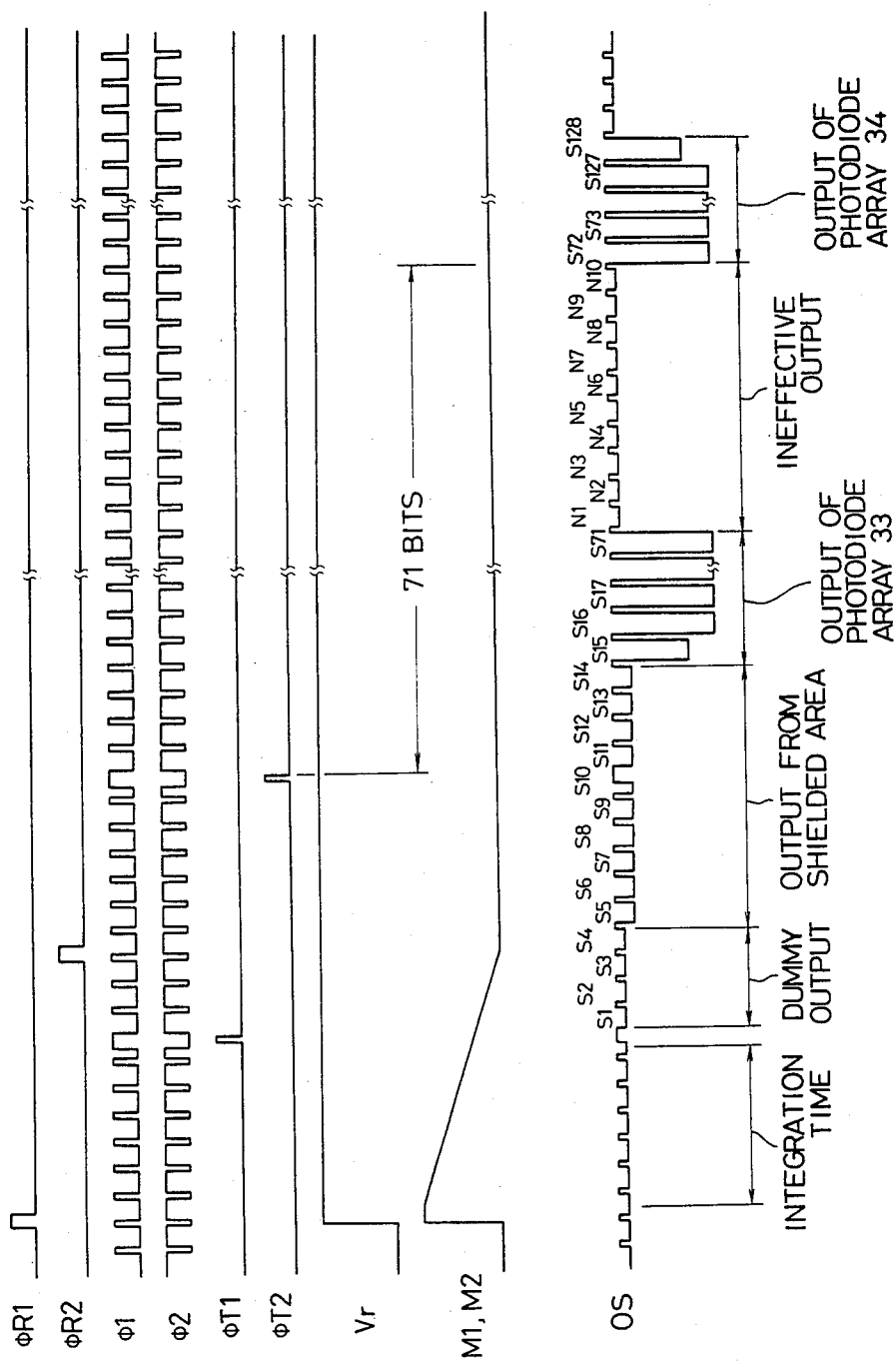
FIG. 3 is a timing chart of operation in a multimode of the charge-coupled device shown in FIG. 1.

FIG. 3 shows a timing chart of a multimode of operation of the CCD. First, the reset terminal 23 is supplied with a reset pulse φR to reset the storage electrode 35 and the capacitors 7 through 9. At the same time that the photoelectric currents from the photodiode array 33 start being integrated by the storage electrode 35, the voltages across the capacitors 7, 8 begin to drop due to the photoelectric currents from the monitoring photodiodes 5, 6. When the voltage A indicative of the average value of the monitor signals M1, M2 or one of the monitor signals M1, M2 is lower than the trip voltage B, the shift pulse generator applies a shift pulse φT1 to the shift terminal 25 thereby opening the shift gate 37, which then allows the charges from the storage electrode 35 to be transferred to the analog shift register 4. A reset pulse oR2 is applied to the reset terminal 24 upon elapse of a time period corresponding to a shutter exposure duration after the reset pulse φR1 has been applied, thus resetting the storage electrode 36. Upon further elapse of a time period corresponding to the time difference between the reset pulse φR1 and the shift pulse φT1, a shift pulse φT2 is applied to the shift terminal 26 to open the shift gate 38 for thereby transferring the charges from the storage electrode 36 to the analog shift register 4. The analog shift register 4 is responsive to transfer clock signals φ1, φ2 for successively issuing the charges from the storage electrodes 35, 36, and the output terminal 32 therefore issues an image signal generated by the photodiode array 33. Then, the output terminal 32 produces an ineffective output for a time period corresponding to the time difference between the reset pulses oR1, oR2, and thereafter an image signal generated by the photodiode array 34 is issued from the output terminal 32. In this multimode, the photoelectric currents from the photodiode arrays 33, 34 are integrated at timings which differ by the shutter exposure duration, but errors in the integration processes (the amount of a camera shake) are affected equally with respect to the photodiode arrays 33, 34. Actually, the amount of the camera shake appears on the image signal OS at times differing by the shutter exposure duration. The image signal OS can be utilized for accurately detecting a camera shake.

Where the shutter exposure duration is long, the time difference between the reset pulses φR1, φR2 may be limited to a certain period of time, and the limited period may be corrected through arithmetic operations. The CCD of the invention may be modified as by employing three or more monitoring photodiodes.

With the arrangement described above, the CCD includes plural photodiode arrays, plural storage electrodes, plural shift gates, plural reset terminals, and plural shift terminals, and these can be operated at different timings to produce an image signal which is utilized for camera shake detection.

A camera shake detector incorporating the CCD described above will be described hereinbelow.

Figure 4:
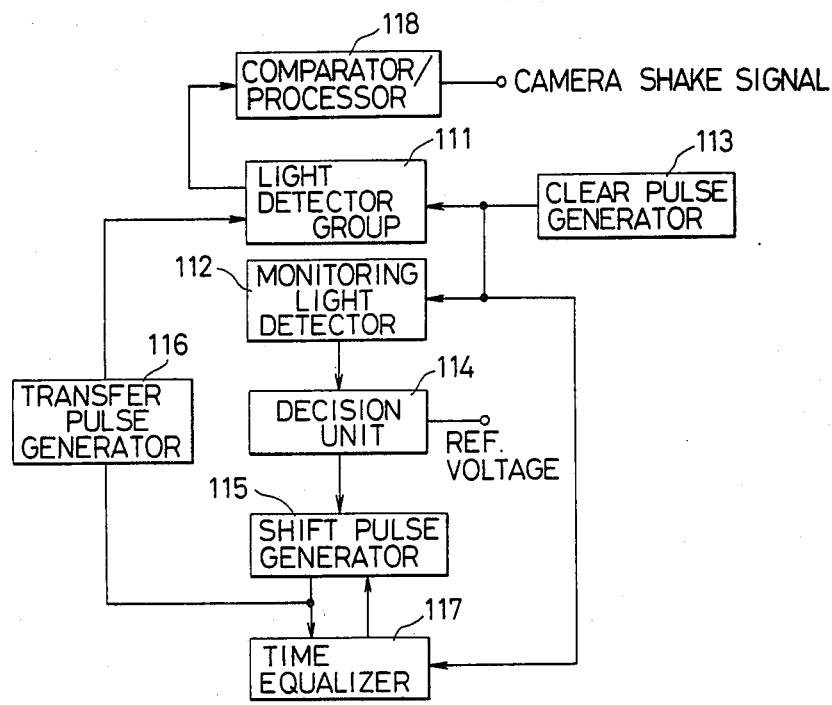
FIG. 4 is a block diagram of a camera shake detector according to the present invention.

FIG. 4 shows in block form such a camera shake detector according to the present invention. The camera shake detector comprises a light detector group 111 for photoelectrically converting an object image that has been focused by an optical system, a monitor light detector 112 disposed adjacent to the light detector group 111 for photoelectrically converting the average brightness of the object image, a clear pulse generator 113 for generating a pulse to clear the monitor light detector 112 and the light detector group 111 to a certain level, a decision unit 114 for ascertaining whether the output from the monitor light detector 112 is lowered below a reference voltage, a shift pulse generator 115 for producing a pulse to shift stored charges from the light detector group 111 to a transfer unit if the output from the monitor light detector 112 is found to be lower than the reference voltage by the decision unit 114 and for producing a second pulse to shift the stored charges again from the light detector group 111 after the above transfer of the stored charges from the light detector group 111 has been completed, a transfer pulse generator 116 for generating a pulse to transfer the stored charges from the light detector group 111, a time equalizer 117 for equalizing the time period between the first clear pulse and the first shift pulse and the time period between the second clear pulse and the second shift pulse, and a comparator/processor 118 for comparing first and second image outputs from the light detector group 111 to determine whether there is a camera shake or not.

Prior to detailed description of the camera shake detector of the present invention, the principles thereof will be described below.

In an image detector, relative movement of the image an object being measured on a detector screen can be detected by comparing an object image produced at a certain time with an object image produced upon elapse of a prescribed time period (hereinafter referred to as "Tα") from the certain time. If the object thus measured is an object to be photographed and if the image detector is an automatic focusing device for a camera, then relative movement of the object image within the time period T can be detected. In the event that the detected relative movement is in excess of a certain level, then it can be determined that there is a camera shake, and such a camera shake can thus be detected.

In the above device for detecting relative movement of an object image, it is ideal to detect the same object with the same optical system and the same detector element. Where an integration-type device such as a CCD is used for photoelectrically converting an object image, however, the time period Tα cannot freely be selected. More specifically, if the object to be measured is a general object to be photographed and if the object image is to be detected for finding a camera shake, then such a camera shake can well be detected when the shutter speed is low, i.e., the object brightness is low. In such a case, the integration time of the detector element is long. In the case where relative movement of an object image is to be detected with the same optical system and the same detector element, the time period Tα is required to be longer than the integration time. A camera shake is determined in relation to the shutter speed, and in view of this, the time period Tα should preferably be commensurate with the shutter speed.

It can be seen from the foregoing discussion that the integration time and the shutter speed should somehow be related to each other. In a camera, however, the shutter speed is determined in combination with various parameters such as the film sensitivity, lens aperture, and the like, and there is no constant relationship between the integration time of the detector element such as a CCD and the shutter speed. That is, there are various instances where the time period Tα may not be long even if the integration time is long. It is impossible to cope with such instances with the same optical system and the same detector element. It follows from the above that two optical systems and two detector elements are required for camera shake detection.

Figure 5:
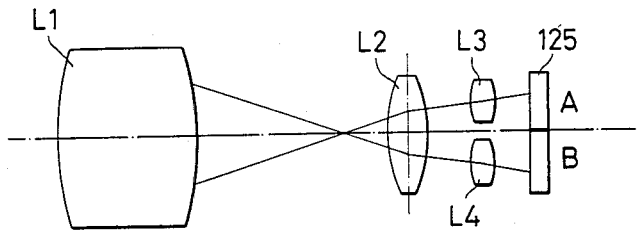
FIG. 5 is a schematic diagram of a focusing optical system that can be incorporated in the camera shake detector shown in FIG. 4.
Figure 6:
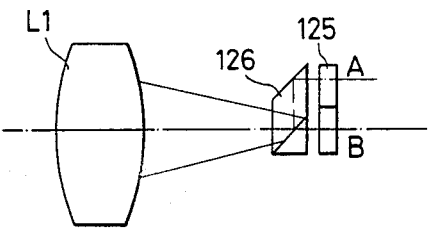
FIG. 6 is a schematic diagram of another focusing optical system that can be incorporated in the camera shake detector shown in FIG. 4.

An arrangement for forming the image of one object on two detector elements can be implemented by an optical system used in a presently available automatic focusing device for a camera. FIG. 5 shows an optical system in an automatic focusing device based on the principle of correlation. This optical system has an image-formation lens L1, a condenser lens L2, and two lenses L3, L4 for forming the same object images on a pair of sensor arrays A, B of a CCD 125. Another optical system shown in FIG. 6 is used in an automatic focusing device based on the principle of contrast. The optical system includes an image-formation lens L1 and a beam splitter 126 for dividing the optical path into two optical paths to form the same object images on a pair of sensor arrays A, B of a CCD 125. The optical system of FIG. 5 can be employed in a light detector arrangement shown in FIG. 7, whereas the optical system of FIG. 6 can be employed in a light detector arrangement shown in FIG. 8.

In automatic focusing operation, a clear pulse $\phi r$ and a shift pulse $\phi t$ for a CCD are produced at the same time. If these pulses are produced at variable times, an automatic focusing device can be utilized for camera shake detection.

If an automatic focusing device is utilized for camera shake detection, then it will be effective to follow the procedure described below. First, the distance up to an object to be photographed is measured with $T\alpha=0$ and an automatic process is effected to move the object lens into a focused position. Then, after it is confirmed that the lens is in the focused position, the time period $T\alpha$ is set to a value proportional to the shutter speed for camera shake detection. The reason for the above procedure is as follows: Where the automatic focusing arrangement of FIG. 7 on the correlation principle is employed, there is produced an image deviation on the arrays A, B of the CCD when the lens is not focused, and the defocused amount of the lens is calculated by detecting such an image deviation. If a camera shake were detected at this time, then information as to the defocused amount of the lens and information as to the camera shake would be mixed together and it would be impossible to detect the camera shake accurately. This holds true for the automatic focusing arrangement of FIG. 8 based on the contrast principle.

Figure 7:
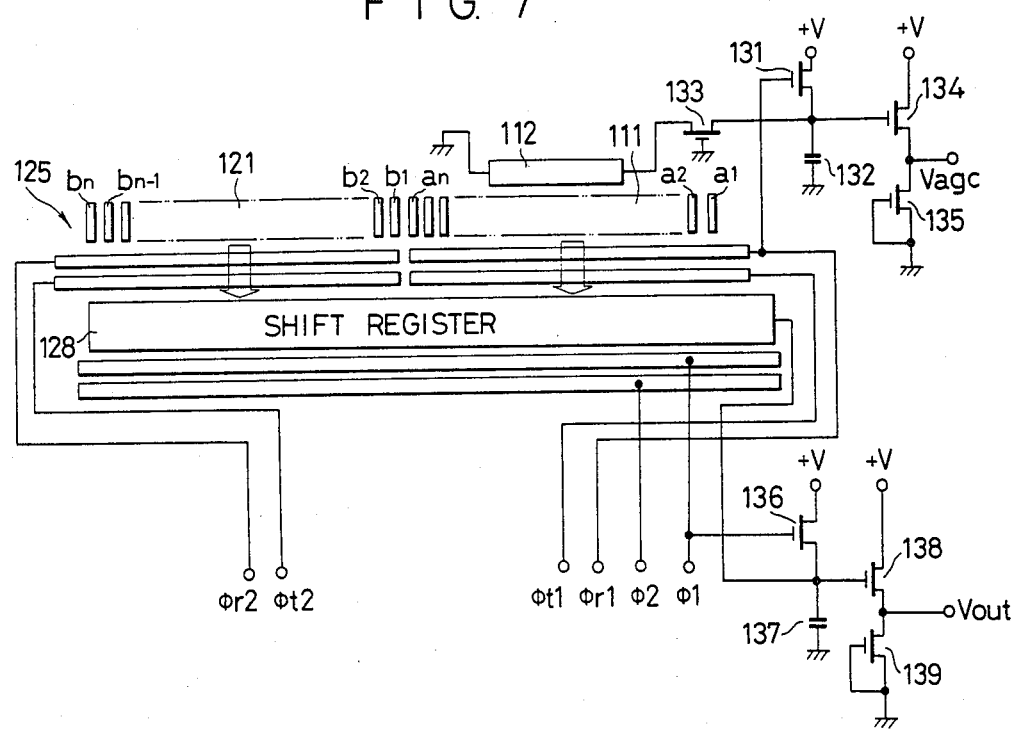
FIG. 7 is a circuit diagram, partly in block form, of a charge-coupled device which can be employed in the camera shake detector.

A detailed structure of the camera shake detector will now be described below. FIG. 7 shows a CCD 125 which is of substantially the same construction as that of the CCD illustrated in FIG. 1. The CCD 125 has a first light detector group 111 composed of a photodiode array A, a second light detector group 121 composed of a photodiode array B aligned with the photodiode array A, and a shift register 128 for transferring stored charges of respective pixels constituted by the light detector groups. The CCD 125 detects light from an object which has passed through the lens of a camera. A monitoring light detector 112 is disposed in the vicinity of the first light detector group 111 for monitoring the condition of charge storage in the CCD 125. The first light detector group 111 serves to photoelectrically convert an object image formed by an optical system, and the second light detector group 112 serves to photoelectrically convert an object image formed by another optical system. The monitoring light detector 112 photoelectrically converts the average brightness of the object image.

Figure 9:
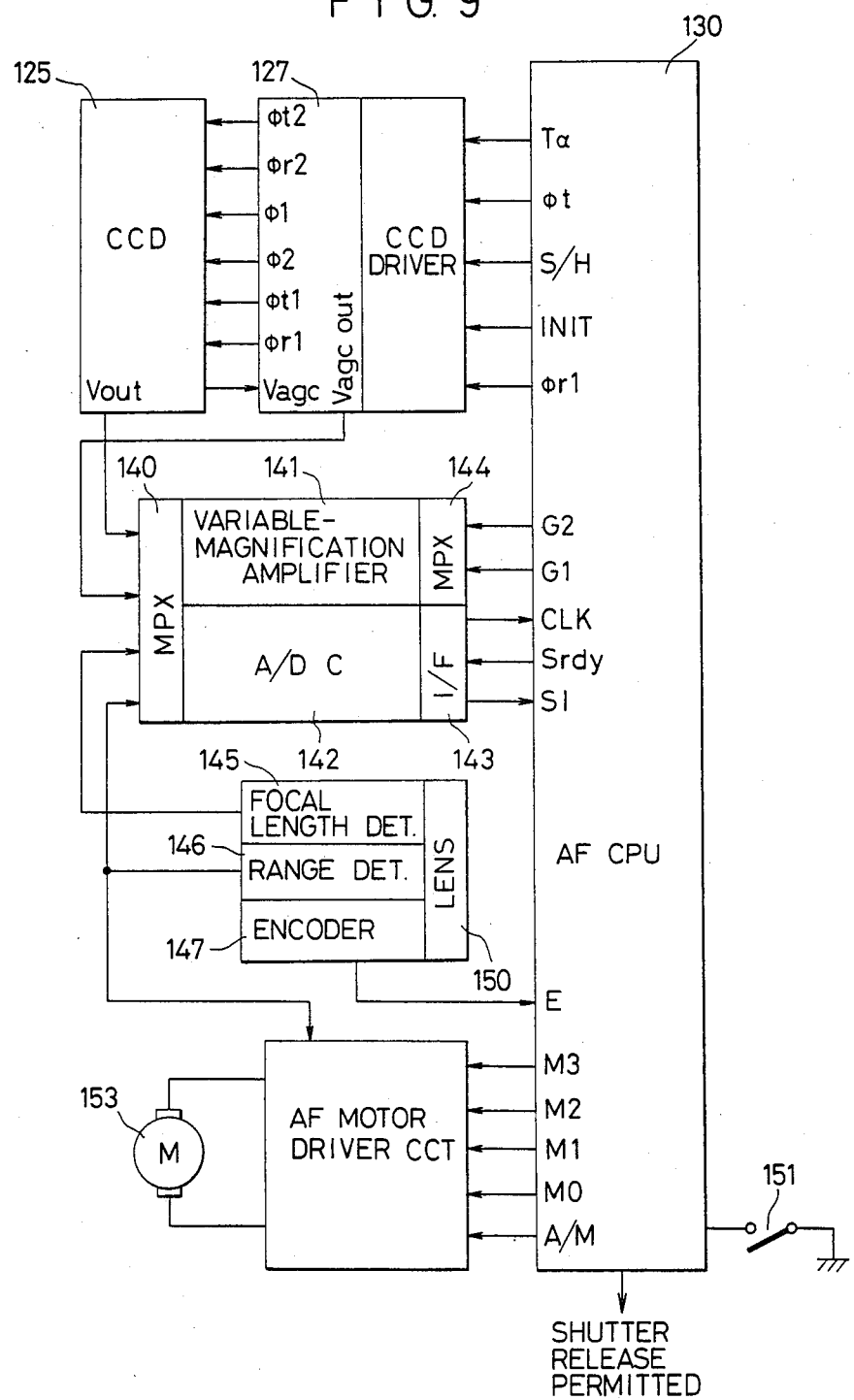
FIG. 9 is a block diagram of a control system in the camera shake detector.

In FIG. 9, an automatic focusing central processing unit (hereinafter referred to as an "AFCPU") 130 applies a command signal to a CCD driver 127 to drive the CCD 125. The CPU 130 includes a clear pulse generator. When a clear pulse $\phi r1$ is generated by the clear pulse generator, a transistor 131 (FIG. 7) is turned on to charge a capacitor 132 with a power supply +V. At the same time, the first light detector group 111 and the monitoring light detector 112 are cleared to a constant level by the clear pulse. When the clear pulse $\phi r1$ goes low, a photoelectric current commensurate with the brightness distribution of the object flows in the first light detector group 111 to stored charges in its storage electrode. Simultaneously, a photoelectric current commensurate with the object brightness flows in the monitoring light detector 112 through a transistor 133 and lowers the potential across the capacitor 132. The potential of the capacitor 132 is issued as a monitor output Vagc to the CCD driver 127 via a buffer amplifier comprising transistors 134, 135.

In an automatic focusing process, the AFCPU 130 applies a command to the CCD driver 127 to produce a second clear pulse $\phi r2$, at the same time the clear pulse $\phi r1$ is issued. As the second clear pulse $\phi r2$ is generated, the second light detector group 121 is cleared to a constant level. When the second clear pulse $\phi r2$ goes low, a photoelectric current proportional to the object brightness distribution flows in the light detector group 121 to store charges in its storage electrode. Operation of the second light detector group 121 has no direct bearing on camera shake detection.

The AFCPU 130 includes the decision unit 114 and the shift pulse generator 115 as described above with reference to FIG. 4. The decision unit 114 ascertains whether the output Vagc of the monitoring light detector 112 becomes lower than a reference voltage Vo (see FIG. 11). The shift pulse generator 115 issues, through the CCD driver 127, a pulse $\phi t1$ for shifting the stored charges from the first light detector group 111 to the transfer unit when the output Vagc of the monitoring light detector 112 is found to be lower than the reference voltage Vo by the decision unit 114. Upon application of the shift pulse $\phi t1$ from the CCD driver 127 to the CCD 125, the shift gate is opened to shift the stored charges from the storage electrode to the shift register 128. During a camera shake detection process, the shift pulse generator 115 produces a second pulse for shifting the stored charges of the first light detector group 111 again after the stored charges of the first light detector group 111 have been transferred.

The time period between the first clear pulse $\phi r1$ and the first shift pulse $\phi t1$ is now measured. The time period between the second clear pulse $\phi r1$ and the second shift pulse $\phi t1$ is equalized to the above measured time period by the time equalizer 117.

The CCD driver 127 generates a pulse $\phi t2$ for shifting the charges from the second light detector group 121 to the transfer unit. When the shift pulse $\phi t2$ is applied by the CCD driver 127 to the CCD 125, the shift gate is opened to shift the stored charges from the storage electrode to the shift register 128. This operation of the second light detector group is not directly related to camera shake detection. During camera shake detection, shifting of the stored charges from the second light detector group to the transfer unit is inhibited.

The CCD driver 127 has the transfer pulse generator 116 (FIG. 4) which generates transfer pulses $\phi 1$, $\phi 2$ for transferring the charges from the first and second light detector groups 111, 121. At the time the transfer pulses $\phi 1$, $\phi 2$ are generated from the CCD driver 127, the stored charges are successively issued as a video signal Vout from the CCD 125 via a buffer amplifier comprising a transistor 136, a capacitor 137, and transistors 138, 139.

As illustrated in FIG. 9, the video signal Vout from the CCD 125 is applied via a multiplexer 140 to a variable-magnification amplifier 141, and the amplified signal is converted by an analog-to-digital converter 142. A digital output from the analog-to-digital converter 142 is applied through an interface 143 to the AFCPU 130. The monitor output signal Vagc from the CCD driver 127 is applied via the multiplexer 140 to the analog-to-digital converter 142 and converted thereby to a digital signal, which is applied via the interface 143 to the AFCPU 130. Before the video signal Vout from the CCD 125 is received, the AFCPU 130 regulates the gain of the amplifier 142 through a multiplexer 144 according to the monitor output signal Vagc. Then, the AFCPU 130 receives the video signal Vout that has been amplified at a gain according to the brightness and contrast of the object image, and calculates a defocused amount with high accuracy.

The AFCPU 130 is supplied with a focal length signal and a range position signal of a lens 150 from respective detectors 145, 146 through the multiplexer 140, the analog-to-digital converter 142, and the interface 143, and is also supplied with pulses from an encoder 147 and a signal from a manual switch 151. The encoder 147 serves as a rotation detector for detecting rotation of a motor 153 for driving the lens 150. The manual switch 151 is a power supply switch comprising a shutter release switch which is turned on when a shutter release button is depressed, for thereby effecting automatic focusing operation.

The AFCPU 130 has the comparator/processor 121 (FIG. 4) for comparing the first and second outputs from the first light detector group 111 to effect an arithmetic operation for ascertaining whether a camera shake takes place. The comparator/processor 121 may be implemented by the range calculating processor of the automatic focusing device.

Operation of the camera shake detector will hereinafter be described with reference to FIGS. 10 and 11.

The automatic focusing device used may be operated in the same manner as that of known automatic focusing devices or as described in Japanese patent application No. 60-241168. More specifically, Tα is set to "0" in response to a range-finding start signal, and the outputs from the first and second light detector groups 111, 121 in the CCD 125 are employed in an arithmetic operation for automatic focus detection. The lens is driven to move toward the focused position based on the result of the arithmetic operation. When it is confirmed that the lens is focused, then whether camera shake detection is to be effected or not is checked, and if camera shake detection is to be carried out, then the operation sequence of FIG. 10 is executed.

Figure 10:
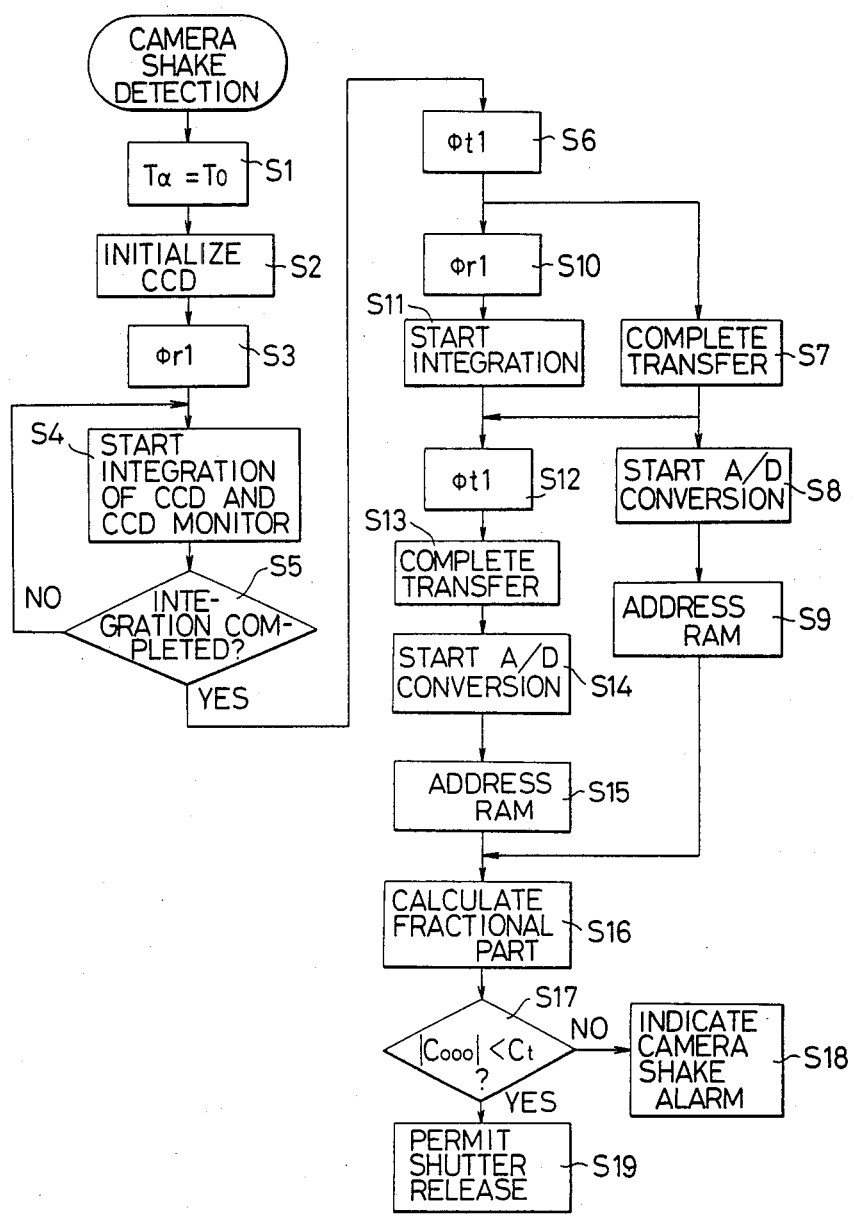
FIG. 10 is a flowchart of an operation sequence of the camera shake detector.
Figure 11:
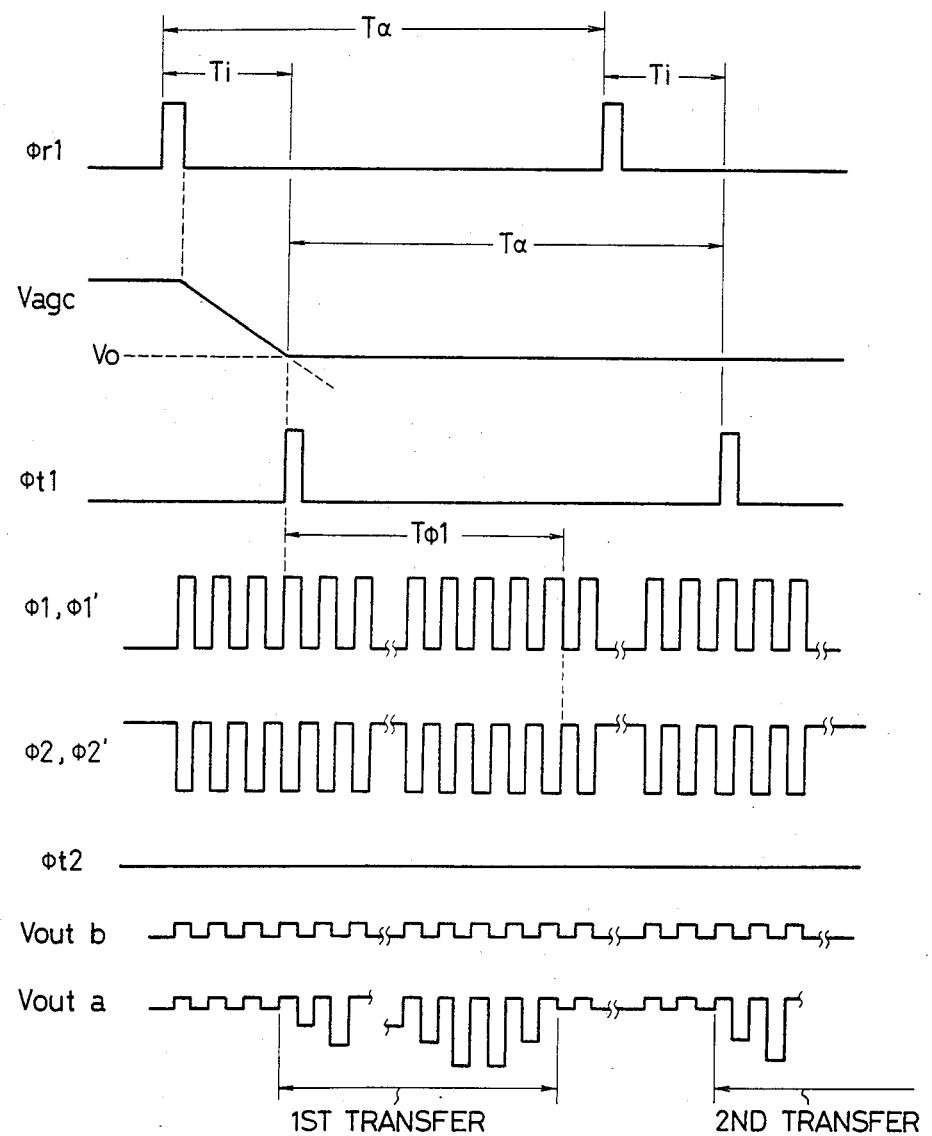
FIG. 11 is a timing chart of operation of the camera shake detector.

As shown in FIG. 10, a step S1 sets Tα to a constant having a value To proportional to the shutter speed that has been determined by a photometric process. Then, the CCD 125 is initialized in a step S2. It is assumed that Tα is of a value larger than the sum of a time Tφ1 required to transfer the stored charges from the light detector group 111 and a first integration time Ti (see FIG. 11). If the time required to issue 1-bit data of the light detector group 111 is 130 microseconds and 64 bits of data are to be issued, then the time interval Tφ1 required to transfer the stored charges is 8.3 msec. Then, a clear pulse φr1 is issued from the clear pulse generator 113 in a step S3 to clear the monitoring light detector 112 and the first light detector group 111 to a constant level. Integration of the light detector group 111 and the monitoring light detector 112 of the CCD 125 are then started in a step S4. Thereafter, control goes to a step S5 which ascertains whether the output voltage from the monitoring light detector 112 is lowered below the reference voltage, i.e., the integration has been completed. If the integration is finished, then a first shift pulse φt1 is generated by the shift pulse generator 115 in a step S6.

The stored charges of the light detector group 111 are shifted in response to the shift pulse φt1 and transferred by a transfer pulse from the transfer pulse generator 116 in a step S7. Upon completion of the charge transfer, the charges are converted to a digital signal in a step S8. A random-access memory (RAM) is addressed in a step S9 to store the first image signal from the light detector group 111 into the memory.

After the step S6, a second clear pulse φr1 is produced by the clear pulse generator 113 in a step S10 with a time delay To from the first clear pulse φr1 for thereby clearing the light detector group 111 again to a certain level. Then, the light detector group 111 starts being integrated in a step S11, and a second shift pulse φt1 is issued from the shift pulse generator 115 in a step S12. The time period between the first clear pulse and the first shift pulse is measured at this time. In the step S12, the second shift pulse is generated to enable the time equalizer 117 to equalize the time period between the second clear pulse and the second shift pulse to the above measured time period.

The stored charges of the light detector group 111 are shifted by the second shift pulse produced in the step S12 and transferred by a transfer pulse. Upon completion of the charge transfer in a step S13, the charges are converted to a digital signal in a step S14, and the RAM is addressed in a step S15 to store the second image signal in the RAM.

Any variation in the image-to-image distance is calculated in a step S16 based on the first and second digital image signals. This calculating process is the same as the range calculating process in the automatic focusing device. In a step S17, the absolute value of the result Cooo of the above calculation is compared with a critical value Ct to determine whether a camera shake has occurred. If the absolute value of Cooo is in excess of Ct, then a camera shake alarm is indicated in a step S18. If not, then a shutter release is permitted in a step S19. The operation sequence for camera shake detection is thus put to an end.

In the above embodiment, the automatic focusing device is utilized for camera shake detection. In the automatic focusing mode, video signals from the first and second light detector groups are simultaneously issued for focus detection. In the camera shake detecting mode, however, first and second video signals are issued at a time interval Tα from the first light detector group, and time-dependent movement of an object image is calculated from the first and second video signals for camera shake detection. Therefore, it is possible to detect a camera shake commensurate with the speed of movement of the object. Since the hardware of the automatic focusing device is employed as it is and only software or operation sequence thereof is required to be modified, a camera shake detector can be provided at a low cost. Moreover, only one light detector group is used in the camera shake detecting mode whereas the two light detector groups are used in the automatic focusing mode, so that only information as to camera shake can be picked up in the camera shake detecting mode for accurate camera shake detection.

The time interval Tα between the first and second image output signals from the first and second light detector groups can be selected according to the skill of the camera user. This allows the camera shake detector to detect camera shake dependent on how skillful the user is.

The camera shake detector of the present invention can equally be incorporated in the automatic focusing device of the contrast principle as shown in FIG. 5 by using only one of the two light detector groups in the camera shake detecting mode. The principles of the present invention can be applied to a camera having no automatic focusing device.

A camera shake detector according to another embodiment of the present invention will now be described with reference to FIGS. 12 through 14.

Figure 12:
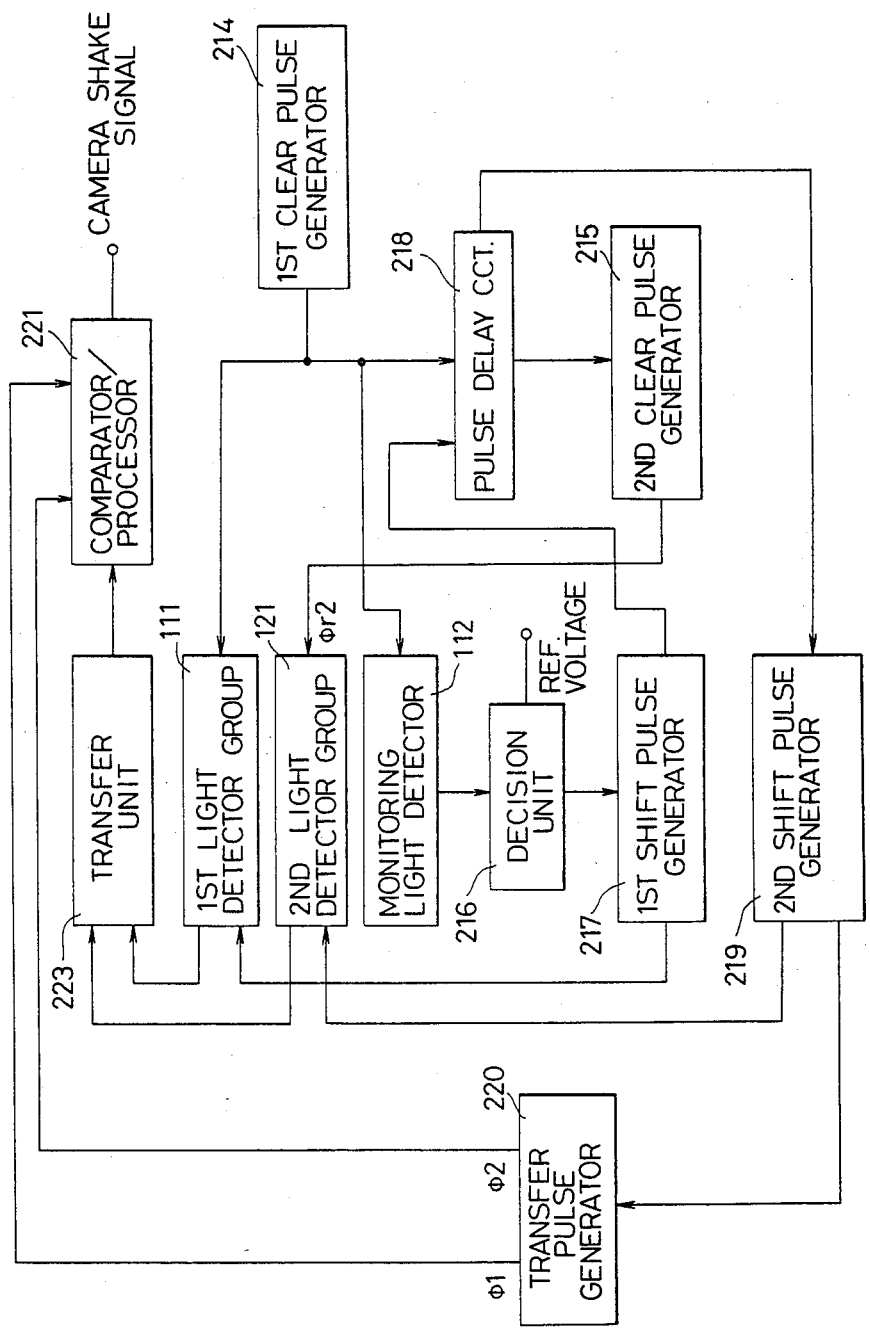
FIG. 12 is a block diagram of a camera shake detector according to another embodiment of the present invention.

FIG. 12 shows in block form the camera shake detector of another embodiment. The camera shake detector comprises a first light detector group 111 for photoelectrically converting an object image formed by an optical system, a second light detector group 121 for photoelectrically converting an object image formed by another optical system, a monitoring light detector 112 disposed in the vicinity of the first and second light detector groups 111, 121 for photoelectrically converting the average brightness of the object image, a first clear pulse generator 214 for generating a first clear pulse to clear the monitoring light detector 112 and the first light detector group 111 to a constant level, a second clear pulse generator 215 for generating a second clear pulse to clear the second light detector group 121 to a constant level upon elapse of a certain time period after the clear pulse has been produced by the first clear pulse generator 214, a decision unit 216 for ascertaining whether an output from the monitoring light detector 112 is below a reference voltage, a first shift pulse generator 217 for generating a first shift pulse to shift the stored charges from the first light detector group 111 to a transfer unit 223 when the output from the monitoring light detector 112 is found to be lower than the reference voltage by the decision unit 216, a second shift pulse generator 219 for generating a second shift pulse to shift the stored charges from the second light detector group 121 to the transfer unit 223 upon elapse of a storage time after the second clear pulse has been generated, a pulse delay circuit 218 for equalizing the time delay between the first and second clear pulses to the time delay between the second clear pulse and the second shift pulse, a transfer pulse generator 220 for inhibiting transfer of the stored charges from the light detector groups at least from the generation of the first shift pulse until the generation of the second shift pulse, and for generating transfer pulses to transfer the stored charges from the light detector groups after the generation of the second shift pulse, and a comparator/processor 221 for comparing outputs from the first and second light detector groups 111, 121 to ascertain whether there is a camera shake or not.

Figure 8:
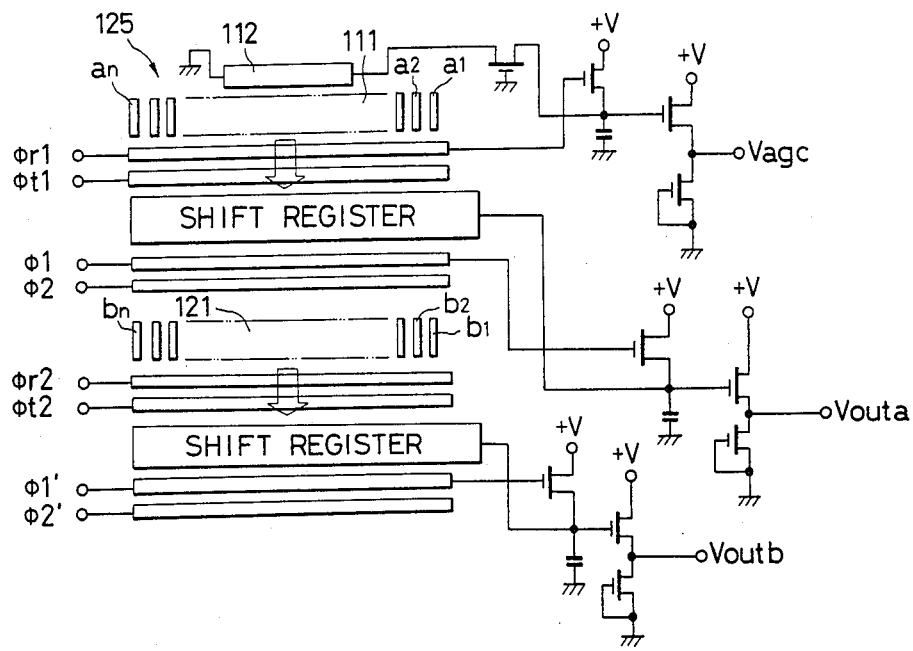
FIG. 8 is a circuit diagram, partly in block form, of another charge-coupled device which can be employed in the camera shake detector.

The optical systems of the camera shake detector shown in FIG. 12 may be identical to the optical system of FIG. 5 or 6, and the CCD may be the same as that shown in FIG. 7 or 8. The control system may be the same as that illustrated in FIG. 9.

Operation of the camera shake detector of FIG. 12 will be described with reference to FIGS. 13 and 14.

First, Tα is set in a step S1 to a constant having a value To which is proportional to the shutter speed, determined by a photometric process. The CCD 125 is then initialized in a step S2. A clear pulse $\phi r1$ is generated by the first clear pulse generator 214 in a step S3 to clear the monitoring light detector 112 and the first light detector group 111 to a certain level. A step S4 then starts integrating the first light detector group 111 of the CCD and the monitoring light detector 112 of the CCD. Control goes from the step S4 to a step S5 which ascertains whether the output voltage of the monitoring light detector 112 drops below the reference voltage, namely, the integration is finished. If the integration is over, then a shift pulse $\phi t1$ is generated by the first shift pulse generator 217 in a step S6.

In a step S7, a clear pulse $\phi r2$, which is delayed by To from the clear pulse $\phi r1$, is generated by the second clear pulse generator 215 to clear the second light detector group 121 to a certain level. Then, the second light detector group 121 is integrated in a step S8. In a step S9, a shift pulse $\phi t2$, which is delayed by To from the shift pulse $\phi t1$, is generated by the second shift pulse generator 219. In response to the shift pulses $\phi t1$, $\phi t2$, the stored charges from the light detector groups 111, 121 are shifted to the transfer unit 223.

After the shift pulses $\phi t1$, $\phi t2$ have been issued, transfer pulses $\phi 1$, $\phi 2$ are applied by the transfer pulse generator 220 to the CCD 125 in a step S10. The random-access memory (RAM) is cleared in a step S11, and the video signals from the CCD 125 are converted by the analog-to-digital converter 142 to digital signals in a step S12. A variation in the image-to-image distance on the first and second light detector groups 111, 121 is calculated in a step S13 based on the digital video signals. This calculating process is the same as the range calculating process in the automatic focusing device. In a step S14, the absolute value of the result Cooo of the above calculation is compared by the comparator/processor 221 with a critical value Ct to determine whether a camera shake has occurred. If the absolute value of Cooo is in excess of Ct, then a camera shake alarm is indicated in a step S15. If not, then a shutter release is permitted in a step S16. The operation sequence for camera shake detection is thus finished.

Figure 13:
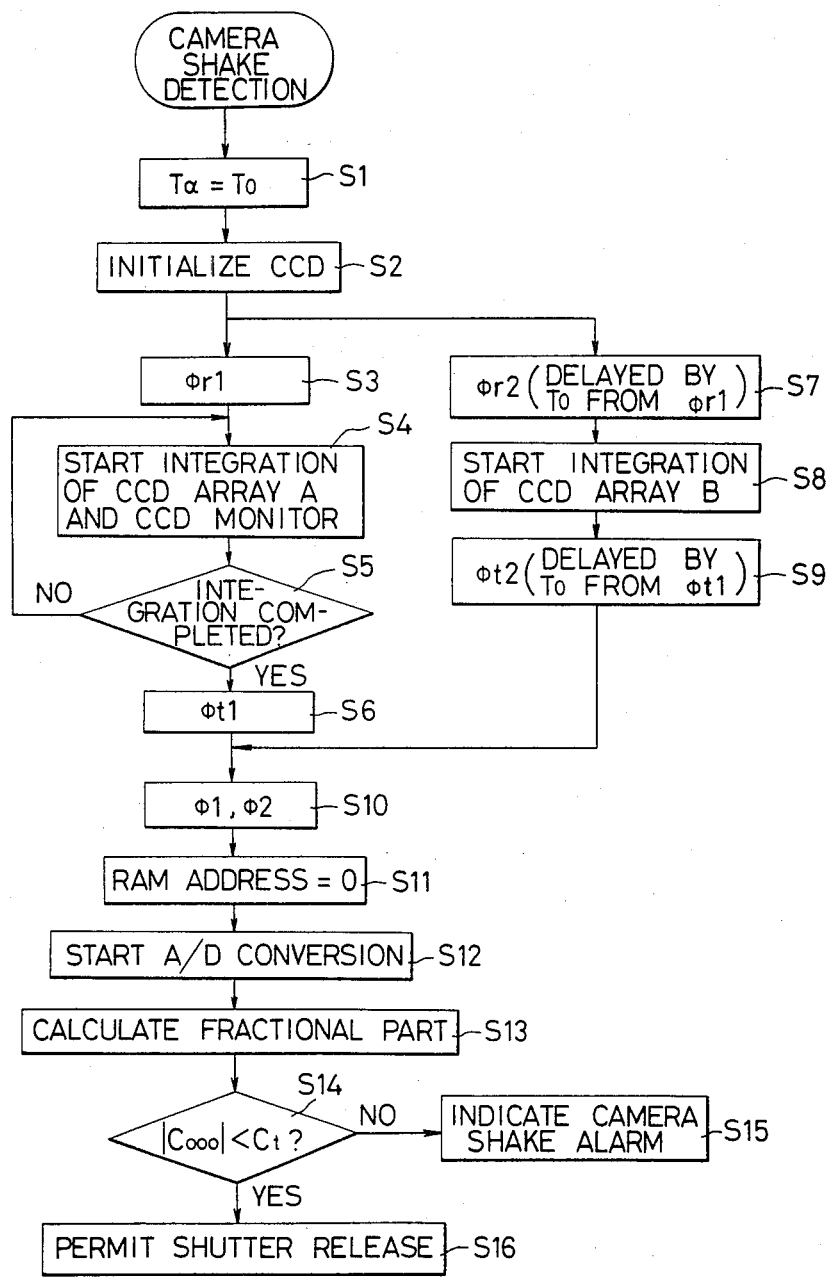
FIG. 13 is a flowchart of an operation sequence of the camera shake detector illustrated in FIG. 12.
Figure 14:
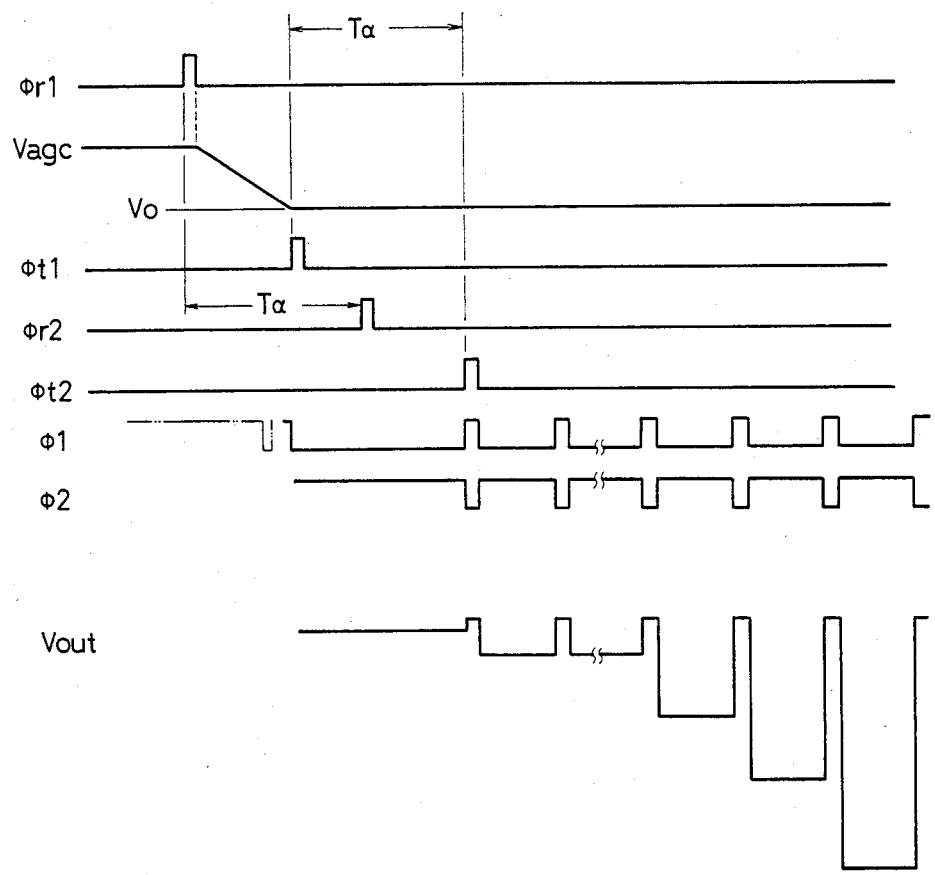
FIG. 14 is a timing chart of operation of the camera shake detector shown in FIG. 12.

In the above embodiment illustrated in FIGS. 12 through 14, the automatic focusing device is utilized for camera shake detection. In the automatic focusing mode, video signals from the first and second light detector groups are simultaneously issued for focus detection. In the camera shake detecting mode, however, video signals are issued at a time interval Tα from the first and second light detector groups, respectively, and time-dependent movement of an object image is calculated from the video signals of the first and second light detector groups for camera shake detection. Therefore, it is possible to detect a camera shake commensurate with the speed of movement of the object. Since the hardware of the automatic focusing device is employed as it is and only software or operation sequence thereof is required to be modified, a camera shake detector can be provided at a low cost. The time interval Tα between the image output signals from the first and second light detector groups can be selected according to the skill of the camera user. This allows the camera shake detector to detect camera shake dependent on how skillful the user is.

Although certain preferred embodiments have been shown and described, it should be understood that many changes and modifications may be made therein without departing from the scope of the appended claims.

We claim:

1. A camera shake detector comprising:
   a light detector group for photoelectrically converting an object image formed by an optical system;
   a monitoring light detector disposed in the vicinity of said light detector group for photoelectrically converting the average brightness of the object image;
   clear pulse generator means coupled to said monitoring light detector for generating a clear pulse to clear said monitoring light detector and said light detector group to a certain level;
   decision means coupled to said monitoring light detector for ascertaining whether an output from said monitoring light detectro drops below a reference voltage;
   shift pluse generator means coupled to said monitoring light detector for issuing a shift pulse to shift stored charges from said light detector group to a transfer unit when the output from said monitoring light detector is found to be lower than the reference voltage by said decision means, and for issuing a second shift pulse to shift stored charges from said light detector group to the transfer unit again after said first-mentioned stored charges have been transferred from said light detector group;
   transfer pulse generator means for generating a transfer pulse to transfer the stored charges from said light detector group;
   time equalizer means for equalizing a time period between a first cliear pulse and a first shift pulse to a time period between a second clear pulse and a second shift pulse; and
   a comparator/processor for comparing first and second image output signals from said light detector group to ascertain whether there is a camera shake.

2. A camera shake detector comprising:
   a first light detector group for photoelectrically converting an object image formed by an optical system;
   a second light detector group for photoelectrically converting an object image formed by another optical system;
   a monitoring light detector disposed in the vicinity of said first and second light detector groups and coupled thereto for photoelectrically converting the average brightness of the object image;
   first clear pulse generator means for generating a first clear pulse to clear said monitoring light detector and said first light detector group to a certain level;
   second clear pulse generator means for generating a second clear pulse to clear said second light detector group to a certain level upon elapse of a time period after the first clear pulse has been generated by said first clear pulse generator means;
   decision means for ascertaining whether an output from said monitoring light detector drops below a reference voltage;
   first shift pulse generator means for issuing a first shift pulse to shift stored charges from said first light detector group to a transfer unit when the output from said monitoring light detector is found to be lower than the reference voltage by said decision means;
   second shift pulse generator means for generating a second shift pulse to transfer stored charges from said second light detector group to the transfer unit, with a time delay between said first and second shift pulses being equalized to a time delay between said first and second clear pulses; and
   a comparator/processor for comparing image output signals from said first and second light detector groups to ascertain whether there is a camera shake.

* * * * *